Aug. 12, 1958
E. J. SCHAEFER
2,847,631
PROTECTION AND REMOTE OPERATING CONTROL
OF ELECTRIC MOTORS
Filed May 17, 1956
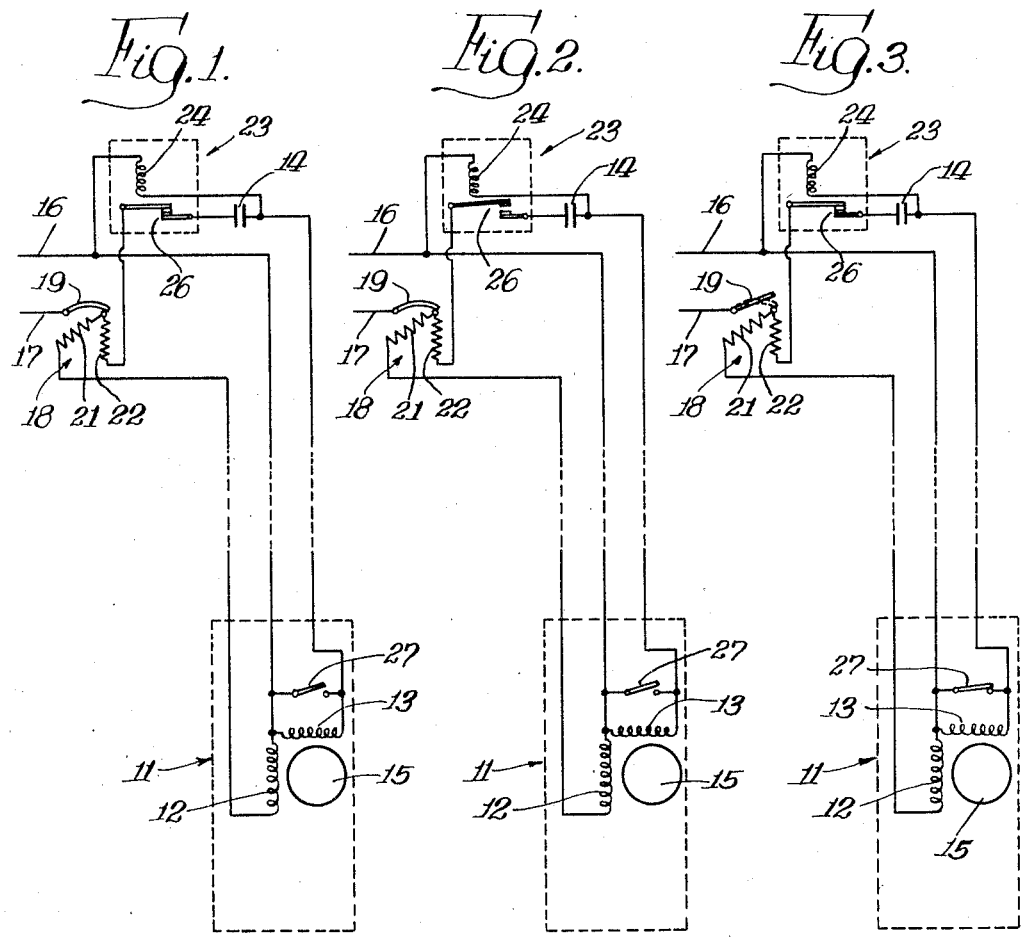
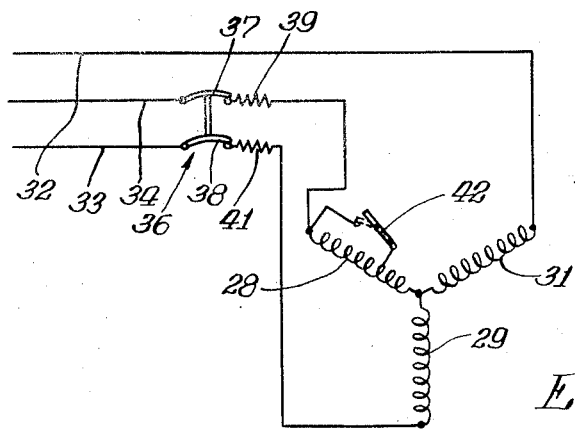
INVENTOR.
Edward J. Schaefer
BY United States Patent Office 2,847,631
Patented Aug. 12, 1958

2,847,631

PROTECTION AND REMOTE OPERATING CONTROL OF ELECTRIC MOTORS

Edward J. Schaefer, Fort Wayne, Ind.

Application May 17, 1956, Serial No. 585,573

15 Claims. (Cl. 318—221)

This invention relates to electric motor operation, and in particular to a novel mode of controlling and affording protection to an electric motor.

Customarily electric motors are provided with overload protectors that afford protection against overheating due to excessive overload current flow to the motor. Such protectors may effect such protection by opening the motor circuit either adjacent the motor or at a point remote therefrom upon the occurrence of such overload current flow to the motor. Also, motors are commonly provided with control devices that are responsive to a variable characteristic that may exist in any given installation, such as the temperature of the motor or a device driven by the motor, the pressure of a fluid being pumped in the installation, a vapor pressure existing in the installation, or other such characteristics. These control devices are used for automatically effecting operational control of a motor in response to a variation in one or more of such characteristics, as for example, shutting off a motor when it becomes overheated due to causes other than overload current flow, or for shutting off a motor when a given pressure drops below a certain level, or the like. These control devices also may be arranged to open the motor circuit either adjacent the motor or at a point remote therefrom. Heretofore, when such devices were arranged to control the motor by opening the motor circuit at a point remotely located from the motor, leads in addition to the normal power leads from the motor to that point were required. If the devices were arranged to open the motor circuit adjacent the motor, arcing in that area would likely occur upon such opening, and in many installations arcing is intolerable. Furthermore, notwithstanding their relative locations, the devices heretofore provided have been bulky, complex and relatively expensive.

It is therefore a primary object of this invention to provide novel means for controlling a remotely located electric motor in response to changes in a characteristic of the installation, such that additional leads are not required.

Another object is to provide a motor having the usual current responsive overload protector and novel means for effecting operation of said protector to open the power circuit to the motor in response to changes in a characteristic of the installation.

Still another object is to provide a novel device for automatically controlling an electric motor that has the usual current responsive overload protector located remotely from the motor, which device avoids arcing adjacent the motor.

A further object is to provide a novel device for automatically controlling a remotely located electric motor in response to changes in a characteristic of the installation, which device is simply constructed, inexpensive and generally requires little space.

Yet another object is to provide a novel method of automatically remotely controlling an electric motor in response to changes in a characteristic of the installation.

Another object is to provide a novel method of protecting an electric motor against overheating from causes other than excessive current.

A further object is to provide an electric motor having the usual current responsive overload protector and novel means for effecting operation of said protector when the motor becomes overheated from causes other than excessive current.

Other objects and advantages of the invention will become apparent from the subsequent description taken in conjunction with the accompanying drawing wherein:

Fig. 1 schematically illustrates a single phase electric motor circuit incorporating one specific embodiment of the invention as it would appear during one operating condition.

Fig. 2 schematically illustrates the circuit shown in Fig. 1 as it would appear during another operating condition.

Fig. 3 schematically illustrates the circuit shown in Fig. 1 as it would appear during still another operating condition.

Fig. 4 schematically illustrates a three phase electric motor circuit incorporating another specific embodiment of the invention.

Broadly speaking the objects are accomplished by effecting increased current flow in the circuit of a motor in response to changes in a characteristic of the installations, such as an increase in motor temperature, an increase or decrease in pressure, etc. The increased current flow so effected is utilized to actuate a normal current responsive overload protector in the motor circuit to open that circuit and thus stop the motor. In other words, a sufficient change in such characteristic is translated into an excessive current flow to the motor, and the latter causes the overload protector to function. Thus, the overload protector is indirectly made responsive to temperature, pressure, or other desired characteristics. In the instant apparatus this end is accomplished by creating a controlled, intentional short circuit in the motor in response to a given change in such a characteristic the short circuit is such that it results in an increased current flow to the motor of a magnitude sufficient to actuate the motors current responsive overload protector.

Referring to the drawing, Figs. 1, 2 and 3 schematically show a single phase motor with its circuit, the motor being indicated generally at 11. Fig. 1 shows the circuit during starting, while Fig. 2 shows the circuit while normally running, and Fig. 3 shows the circuit after a characteristic change has caused the protector to function, either during operation or upon starting. The motor is shown in this instance as a capacitor start induction motor having a running winding 12 and an axially displaced starting winding 13. A capacitor 14 is connected in series with the starting winding 13 to initiate rotation of a rotor 15 during starting, for reasons well understood in the art. The windings 12 and 13 are shown connected across a pair of power lines 16 and 17, and a current sensitive overload protector, shown generally at 18, is interposed between line 17 and the windings 12 and 13 to open the connection thereinbetween upon occurrence of overload current flow thereto.

In this embodiment of the invention, protector 18 is shown as a heat responsive, normally closed, bimetallic switch 19, connected in series with a pair of current excited heaters 21 and 22 which are respectively connected in series with the running winding 12 and the starting winding 13. Each heater 21 and 22 is located to heat the switch 19, and with this arrangement, overload current flow through either or both of the windings 12 and 13 will actuate switch 19 to stop the motor.

Capacitor start motors are normally provided with a device for disconnecting the starting winding circuit when the motor attains a desired rotative speed. While the device may take the form of a centrifugal switch or an electrical relay, the instant embodiment shows a potential relay 23 connected to perform this function. Relay 23 has a coil 24 connected to respond to changes in potential across the starting winding 13. A switch 26 is interposed in the connection to the starting winding containing capacitor 14. Thus relay 23 is operable to open the connection to starting winding 13 containing capacitor 14 by opening its switch 26 when the electromotive force induced in winding 13 through the rotation of rotor 15, reaches a predetermined limit. Likewise, relay 23 closes that connection to starting winding by closing its switch 26 when the induced electromotive force across starting winding falls below said limit.

In order to cause the overload protector 18 to open and stop the motor in response to a sufficient change in a given characteristic, a large sustained current flow to the motor is caused to occur when the characteristic reaches a predetermined limit. This is accomplished in the embodiments illustrated by shorting at least a portion of one of the motor windings. In the embodiment illustrated in Figs. 1, 2 and 3, the shorting is accomplished by means of a shunt connection between the ends of starting winding 13. A normally open switch 27 is interposed in the shunt connection, and is closed in response to said given characteristic reaching a predetermined limit. By closing the switch 27 when it is under load, rather than opening it, arcing is avoided.

While the switch 27 may be actuated in response to any characteristic of the installation, it is often desirable to stop the motor when overheating occurs in the motor due to causes other than overload current flow. Thus, in this instance, switch 27 is shown as a bimetallic heat sensitive switch located to respond to the temperature of the motor and closes when such temperature reaches a predetermined maximum. No additional actuating elements are in this instance required.

During a normal starting of the embodiment illustrated in Figs. 1, 2 and 3, the elements appear substantially as shown in Fig. 1. Protector 18 is normally closed, permitting current to flow through the running winding 12 and through switch 26, capacitor 14 and starting winding 13, as is conventional in the starting of any capacitor start motor. The initial inrush current to the motor is normally very heavy, and if sustained at its initial level would cause heaters 21 and 22 to heat sufficiently to open switch 19 and stop the motor. However, in a normal start, rotor 15 commences to rotate, and as it picks up speed the current flow to the motor diminishes to a level below that necessary to actuate protector 18 before the protector has had time to operate, as is well understood. Should an overload condition occur during this phase of the operation, acceleration of the rotor is reduced or prevented and the current flow remains sufficiently high to open protector 18 and stop the motor.

During the course of a normal start, the mutual inductance existing between the running winding 12 and the starting winding 13 through the medium of the rotating rotor 15, generates an electromotive force across the starting winding. Such electromotive force increases as the rotor speed increases, and at a predetermined rotative speed it is sufficient to energize relay 23 and open switch 26. Thus the starting winding 13 together with capacitor 14 is disconnected, as seen in Fig. 2, and since the induced electromotive force remains impressed across the starting winding 13 as long as the motor runs, the starting winding 13 and capacitor 14 normally remain disconnected. Should an overload condition occur after the starting winding has been disconnected, greater current is drawn by the running winding 12, and heater 21 becomes heated and opens switch 19, thus stopping the motor.

Since switch 27 is shown as a thermo-responsive switch positioned in the motor 11 to be responsive to motor temperature and is operable to close when the motor temperature reaches a predetermined magnitude, when the motor 11 becomes overheated for some reason other than overload current flow to the motor, switch 27 closes as shown in Fig. 3, short circuiting the starting winding 13. When the short circuit occurs before starting, the rotor will not begin to rotate and high inrush current is maintained through heater 21. In addition, a high inrush current will be sustained through switch 27 and heater 22. The combined heat from heaters 21 and 22 quickly opens switch 19 and shuts off the current to the motor. When overheating occurs after the motor has commenced to run, the closure of switch 27 immediately reduces the potential difference between the ends of starting winding 13 to zero. Should the motor have been rotating at sufficient speed to cause switch 26 to open, the aforesaid drop in potential immediately effects its closure. A relatively large current flows through heater 22. Also, a large current flow is induced in the shorted starting winding 13 which in turn immediately induces a heavy current flow through running winding 12 and heater 21. Thus the combined heat from heaters 21 and 22 actuates switch 19 to shut off the current flow to the motor.

This mode of control and protection is equally applicable to motors other than capacitor start induction motors. For example, Fig. 4 schematically shows the three field windings 28, 29 and 31 of a Y connected three phase induction motor. The windings 28, 29 and 31 are shown connected to power lines 32, 33 and 34 respectively. An overload protector shown generally at 36 is interposed between the lines 32 and 33 and their respective windings 28 and 29, to open the connections thereinbetween and stop the motor upon an overload current flow to the motors. In this embodiment of the invention protector 36 has a pair of switch elements 37 and 38 interposed in the lines 32 and 33, as aforesaid. Switch elements 37 and 38 are shown mechanically interconnected to open and close in unison, and are of the heat sensitive type. Protector 36 is also provided with current excited heater means for heating switch elements 37 and 38. In the preferred embodiment the heater means comprises a pair of heaters 39 and 41 respectively connected in series with switch elements 37 and 38 and with windings 28 and 29. Heaters 39 and 41 are located to heat the switch elements 37 and 38, and with this arrangement, overload current to the motor will actuate protector 36 to stop the motor.

As in the single phase motor described above, heavy sustained current is caused to flow in the polyphase motor when the controlling characteristic reaches a predetermined limit. This is accomplished in the embodiment shown in Fig. 4 by shorting out a portion of winding 28 in response to the characteristic reaching such limit. In this embodiment a normally open switch 42 is connected in a shunt connection around a portion of winding 28. Switch 42, like switch 27 in the Fig. 1 embodiment, is normally open but closes in response to the characteristic reaching such limit.

During normal starting, current to a three phase motor is usually reduced by some external starter until the motor has attained a rotative speed sufficient to repress heavy current inrush, as is well understood in the art, and during normal operation, the current through the windings remains below the magnitude necessary to actuate protector 36. Should an overload occur during operation, current flow to the motor increases, and heaters 39 and 41 become heated, opening switches 37 and 38, thus stopping the motor.

While the switch 42 may respond to any desired characteristic of the installation, in the present instance it is shown as responding to the heat of the motor. Upon overheating in the motor, switch 42 closes, short circuiting a portion of winding 28. In as much as flux linkage always exists between the windings of a three phase motor, upon closing of switch 42, current flow to the motor is inductively increased, and if the starter means is not in the circuit, i. e. if the motor is operating normally, the increase in current flow is of sufficient overload magnitude that heaters 39 and 41 open switches 37 and 38, shutting off the current flow to the motor.

From the foregoing it is seen that this invention affords a novel method of controlling and protecting an electric motor. The method utilized lends itself to single phase and polyphase motor operation. It embraces the concept of causing an overload protector, normally provided for a motor, to function and stop the motor in consequence of an intentional short circuit created in the motor circuit in response to a change in a given variable characteristic of the installation. The invention is well adapted to afford protection against overheating in the motor. It requires no additional leads to the motor and effectively avoids arcing in or adjacent the motor. In addition, the structure is sufficiently small or compact to be installed in limited space.

Although the invention has been described with reference to certain specific structural embodiment it is to be understood that various modifications and alternative structures may be resorted to without departing from the scope of the invention as defined in the appended claims.

I claim:

1. In a motor driven installation, an electric motor including a plurality of windings, a current responsive overload protector in circuit with said windings for stopping said motor when the current to said windings exceeds a predetermined magnitude, and means responsive to a variable characteristic in the installation for short circuiting at least a portion of one of said windings upon said characteristic reaching a predetermined limit whereby said current is increased to exceed said predetermined magnitude.

2. In a motor driven installation, an alternating current motor including a plurality of windings, a current responsive overload protector responsive to current flow through one of said windings and adapted to stop said motor when the current through said one winding exceeds a predetermined magnitude, and means responsive to a variable characteristic in the installation for short circuiting at least a portion of said windings upon said characteristic reaching a predetermined limit whereby current flow to said one winding is increased to exceed said predetermined magnitude.

3. In a motor driven installation, an electric motor including a plurality of windings, a current responsive overload protector connected to interrupt current flow to said motor when the current to said windings exceeds a predetermined magnitude, and shunt means around at least a portion of one of said windings, said shunt means including a normally open switch in said shunt, and means responsive to a variable characteristic for closing said switch upon said characteristic reaching a predetermined limit whereby said portion of said one winding is short circuited and the current flow to said windings is increased to said predetermined magnitude.

4. In a motor driven installation, an alternating current motor including a plurality of windings, an overload protector having heater means in circuit with said windings and a heat responsive switch element operable to interrupt current flow to said motor upon a temperature increase caused by sustained current flow of predetermined magnitude through said heater means, and shunt means around at least a portion of one of said windings, said shunt means including a normally open switch in said shunt and means responsive to a variable characteristic in the installation for closing said switch upon said characteristic reaching a predetermined limit whereby said portion of said one winding is short circuited and current flow through said heater means is sustained above said predetermined magnitude.

5. In combination, an electric motor including a plurality of windings, a current responsive overload protector in circuit with said windings for stopping said motor when the current to said windings is above a predetermined magnitude, and means responsive to the temperature of said motor for short circuiting at least a portion of one of said windings upon overheating in said motor whereby current to said windings is increased to exceed said predetermined magnitude.

6. In combination, an alternating current motor including a plurality of windings, an overload protector having heater means in circuit with said windings and a heat sensitive switch element operable to interrupt current flow to said motor upon a temperature increase caused by sustained current through said heater means of predetermined magnitude, and a shunt connection around at least a portion of one of said windings, said shunt connection including a normally open heat responsive switch located to respond to a temperature change in said motor and adapted to close said shunt connection upon said temperature reaching a predetermined maximum and thereby short circuit said portion of said one winding whereby a sustained current flow through said heater means is maintained above said predetermined magnitude until said switch element has functioned.

7. In a motor driven installation, a single phase induction motor comprising a running winding and a starting winding, a current responsive overload protector connected to stop said motor when current to said motor exceeds a predetermined magnitude for a sustained period, and means responsive to a variable characteristic of the installation for interconnecting the ends of said starting winding to short circuit the latter upon said characteristic reaching a predetermined limit, whereby the current flow to said motor is sustained above said predetermined magnitude.

8. In combination, a single phase induction motor having a running winding, a starting winding and a rotor, a motor circuit including said windings, a current responsive overload protector connected in said circuit to interrupt current flow to said motor when current in said running winding is above a predetermined magnitude, and means responsive to a temperature increase in said motor for interconnecting the ends of said starting winding to short circuit the latter upon said temperature reaching a predetermined maximum whereby, during rotation of said rotor, said short circuited starting winding inductively increases the current through said running winding above said predetermined magnitude.

9. In combination, a single phase induction motor comprising a running winding and a starting winding in series with a capacitor, a motor circuit having a connection to said running winding and a connection through said capacitor to said starting winding, a relay responsive to changes in potential difference across said starting winding, a movable switch element interposed in said connection to said starting winding and operable by said relay to open said connection to said starting winding when said potential difference reaches a predetermined limit and to close said connection to said starting winding when said potential difference drops below said limit, an overload protector comprising a first heater element in said connection to said starting winding to be energized by current flow in said connection, a second heater element connected to be energized by current flow through said running winding, and heat responsive switch means operable to disrupt current flow through both of said connections in response to heat from said heater elements, and means for interconnecting the ends of said starting winding to short circuit the latter upon an increase in the temperature of said motor to a predetermined maximum, whereby said heater elements heat sufficiently to open said switch means.

10. In a motor driven installation, a polyphase motor having a plurality of windings, a current responsive overload protector having heater means energized by current through said windings and heat responsive switch means connected to interrupt current flow through said windings when sustained current flow through said heater means is above a predetermined magnitude, and means responsive to a variable characteristic of the installation for closing a shunt around at least a portion of one of said winding upon said characteristic reaching a predetermined limit whereby current flow through said heater means is sustained above said predetermined magnitude to cause said switch means to function.

11. In combination, a polyphase motor having a plurality of windings, a heater element connected in series with one of said windings, heat responsive switch means connected to interrupt current flow through said motor when sustained current flow through said heater element is above a predetermined magnitude, and a shunt connected around a portion of said one winding and including a normally open heat responsive switch located to respond to a temperature increase in said motor to close upon said temperature reaching a predetermined magnitude and thus short circuit said portion whereby current flow through said heater is maintained above said predetermined magnitude to cause said switch means to function.

12. In combination, a polyphase motor having a plurality of windings, a first heater element connected in series with one of said windings, a second heater element connected in series with another of said windings, heat responsive switch means connected to interrupt current flow through said motor when sustained current flow through either of said heater elements is above its respective predetermined magnitude, and a shunt connected around a portion of said one winding and including a normally open heat responsive switch located to respond to a temperature change in said motor and close when said temperature reaches a predetermined maximum and thus short circuit said portion whereby current flow through at least one of said heater elements is maintained above its predetermined magnitude to cause said switch means to function.

13. In combination, a three phase motor having three windings, a first heater element connected in series with one of said windings, a second heater element connected in series with another of said windings, switch means comprising a first switch element connected in series with said one winding and operable to open in response to heat of said first heater element, and a second switch element connected in series with said other winding and operable to open in response to heat of said second heater element, said switch elements being interconnected to open in unison, and a shunt connected around a portion of said one winding and including a normally open heat responsive switch located to respond to a temperature change in said motor and close when said temperature reaches a predetermined maximum to short circuit said portion whereby upon overheating in said motor said heater elements are sufficiently energized to open said switch means.

14. In a motor driven installation, an electric motor including at least one running winding, a current responsive overload protector connected to interrupt current flow to said motor when said current exceeds a predetermined magnitude, a normally open secondary circuit in said motor adapted to increase said current flow an amount sufficient to actuate said overload protector upon closure of said secondary circuit, and means responsive to a variable characteristic of the installation for closing said secondary circuit upon said characteristic reaching a predetermined limit.

15. In a motor driven installation, an electric motor having a running circuit including at least one running winding, a current responsive overload protector in said running circuit and operable to stop said motor when the current in said running circuit is of overload magnitude, a secondary circuit including a normally open switch, and means adapted to increase the current flow in said running circuit to overload magnitude when said switch is closed, and means responsive to a variable characteristic of said installation for closing said switch upon said characteristic reaching a predetermined limit.

References Cited in the file of this patent
UNITED STATES PATENTS
2,066,904    Bartmess _____ Jan. 5, 1937